United States Patent [19]
Lafosse

[11] 3,872,202
[45] Mar. 18, 1975

[54] METHOD FOR BLOWING HOLLOW ARTICLES OF PLASTIC MATERIALS

[75] Inventor: Claude Lafosse, Chalon-sur-Saone, France

[73] Assignee: Saint Gobain Industries, Neuilly-sur-Seine, France

[22] Filed: Apr. 26, 1972

[21] Appl. No.: 247,733

[30] Foreign Application Priority Data
Apr. 26, 1971 France .............................. 71.14777

[52] U.S. Cl.............. 264/89, 264/99, 425/DIG. 204
[51] Int. Cl............................................. B29c 17/07
[58] Field of Search ............ 264/89, 93, 94, 96, 97, 264/98, 99; 425/DIG. 204, 326 B, 342

[56] References Cited
UNITED STATES PATENTS
3,305,891 2/1967 Nozaki.............................. 264/99 X FOREIGN PATENTS OR APPLICATIONS
783,487 4/1968 Canada................................. 264/96
1,920,303 12/1970 Germany.............................. 264/98

Primary Examiner—Jan H. Silbaugh
Attorney, Agent, or Firm—Pennie & Edmonds

[57] ABSTRACT

Method of formation by blowing, of hollow articles such as bottles, of plastic material. Two mold halves are constructed and arranged so that, when brought together they conjointly define the shape of the article to be blown and form an axially disposed mass of hot plastic. A blowing passageway in one of the halves or in one of the halves of a contiguous pair, is in communication with the aforesaid mass. When pressure fluid is applied it forces its way axially through the mass, into the enclosed parison and expands it to the shape of the mold.

3 Claims, 8 Drawing Figures

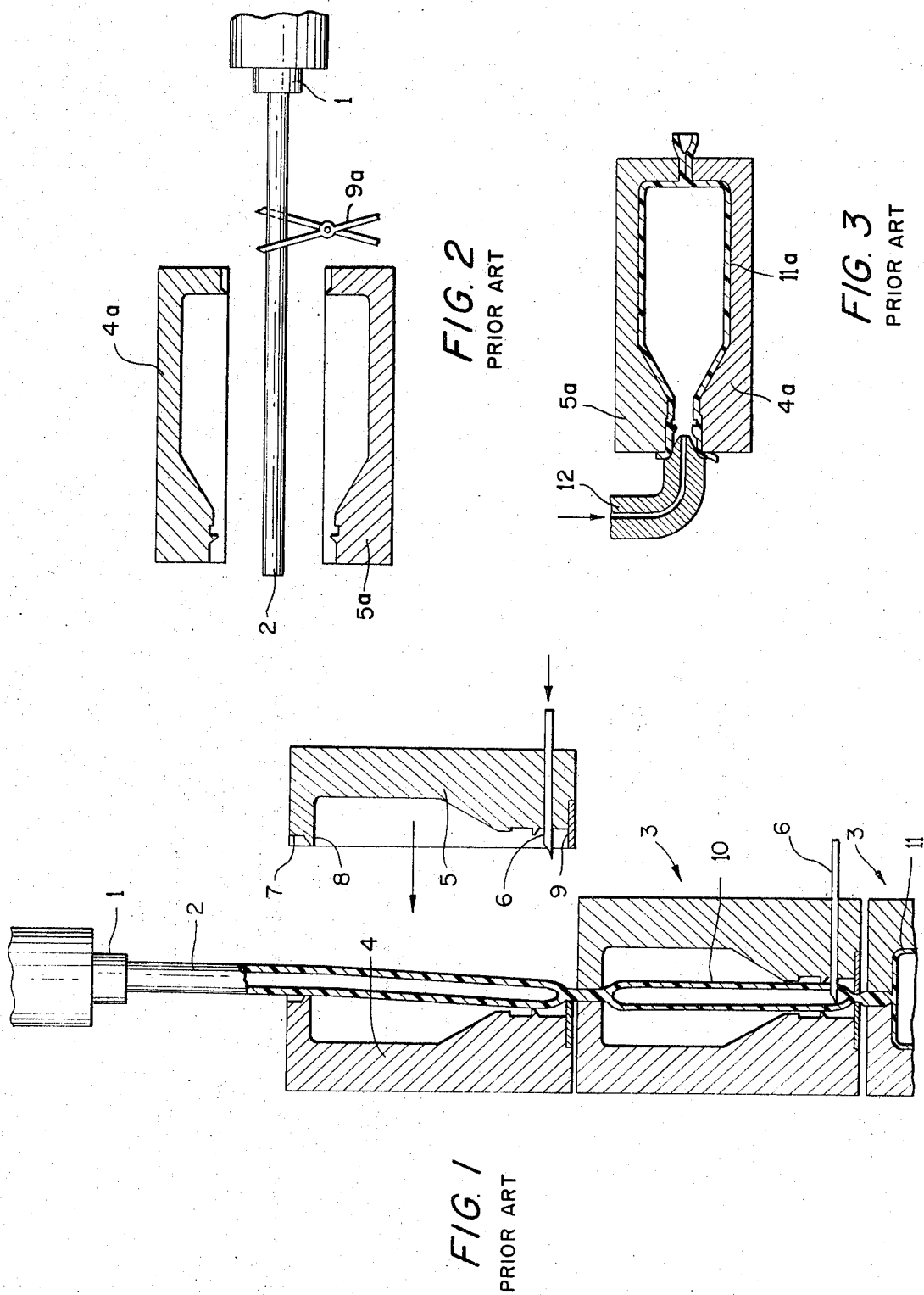

METHOD FOR BLOWING HOLLOW ARTICLES OF PLASTIC MATERIALS

BACKGROUND OF THE INVENTION

The invention relates to a method of fabrication of hollow articles of plastic material, such as bottles.

In prior art procedures involving extrusion and blowing, hollow articles of plastic material are formed from lengths of extruded tubing or parisons each of which is enclosed between two complementary mold halves. Then each parison is blown while confined within its mold, by the introduction of fluid under pressure with the result that the parison is expanded into conformance with the shape of the mold.

In accordance with one prior art procedure the blowing of the rough or parison is effected by a hollow needle fixed with one of the mold halves or moved by a jack through an aperture therein. The needle punctures the wall of the parison after it is enclosed within the mold and pressure fluid is then introduced through the needle. The procedure outlined is in particular useful in machines which operate to produce articles in a continuous manner.

In order to avoid certain known drawbacks common to the aforesaid procedure it has been proposed to simply pierce the hollow rought or parison by force exerted by the pressure fluid itself. In that method the rough, parison, or blank is pierced at a location thereof which is relatively thin, by a nozzle which contacts the wall of the parison at that location and projects a jet of pressure fluid which forces its way into the parison. However, in that method a portion of the fluid from the nozzle tends to escape into the space existing at that time, between the parison and the interior of the mold. In an obvious manner the fluid thus escaping interferes with the accurate shaping of the article because its walls may be thereby prevented from full or complete contact with the walls of the mold.

Another prior art blowing process is widely used in machines which operate in a discontinuous manner. In that procedure, a parison which has been previously severed at its lower end from the one next below, descends vertically from the extruding head and enters between two presently-open mold halves. The halves are then closed together.

Next, the extruded tube descending from the head is cut off between the head and the mold. The construction and operation are such that an end portion of the parison remains exposed and open, and the pressure fluid is then introduced through that open end. In an important variation of the aforesaid procedure, advantage is taken of the fact that a free space exists above the mold, enabling movement of a nozzle into the axis of the mold and into contact with the open, cut-off end of the parison. At that end the mold halves conjointly form a mass of the plastic material exteriorly of but affording access to the interior of the parison. The mass retains an internal temperature and fluidity sufficient to enable the pressurized blowing fluid to penetrate through it and thus pass to the interior of the parison.

SUMMARY OF THE INVENTION

In distinction from the procedures above outlined, the present invention, instead of providing a thin-walled and fragile spot on the parison to make possible easy penetration and access of the pressure fluid into the parison, provides for the injection of the fluid directly into the aforesaid mass or accumulation which, being hot enough to flow under pressure, opens into a free passageway to the inside of the parison within its mold. As will be understood, the fluid enters the interior of the mass or accumulation of material in such direction that the resistance to penetration thereof into the parison, is a minimum. This is usually along the line of highest available temperature. Generally the fluid trajectory is automatically centered in and along the axis of the mass. The jet of fluid cannot then deviate toward and pass into the space then existing between the parison and mold.

The invention has for its chief object the provision of a method which utilizes, efficiently and uniformly, the perforation or penetration by a jet pressurized fluid, of the mass of material located on the axis of the parison. Thus the drawbacks explained in the preceding paragraphs are avoided.

Another object is to provide a method by which molds of shorter over-all length can be used for the production, for instance, of a bottle of given height.

It is also an object to provide a method useful in the production of articles, in particular, bottles, of plastic material, by continuous or discontinuous procedure.

Other objects and advantages will be apparent to those skilled in the art, after a study of the following detailed description.

In general the novel method is characterized by injecting pressure fluid into the interior of a mass forming an integral continuation of the parison, each finished article being detached after cooling and demolding. The molds used are generally equipped with a pipe located interiorly or within one end wall of one of its halves. In usual practice the leading end wall of one mold half is the one having the pipe but, preferably the pipe may be within the trailing end wall of one of the mold halves immediately ahead of the mold containing the parison to be blown. The pipe passes laterally or radially into the mass of material formed when the two halves of each mold pair are brought together into mold-forming relation.

BRIEF DESCRIPTION OF THE DRAWING

FIG. 1 is a longitudinal vertical section through a portion of the apparatus for forming bottles of plastic material in accordance with prior art methods;

FIGS. 2 and 3 show views in longitudinal section of prior art apparatus for performing two sequential steps;

DESCRIPTION OF THE PRIOR ART

Figure 4:
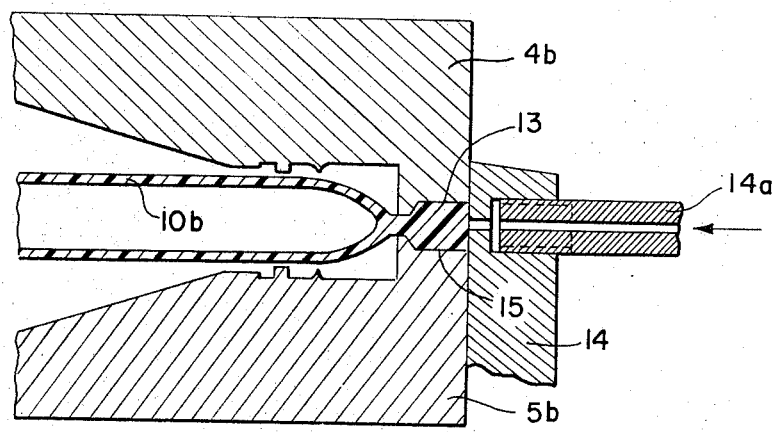
FIG. 4 shows in axial section a portion of apparatus for blowing through an accumulated mass of material.

FIG. 1 shows a prior art procedure for the formation of bottles of plastic material. A head 1 extrudes a tube 2 of the material. A plurality of molds 3 are located in axially-aligned sequence below the head and in operative relation with the extruded tube. Each mold consists of two complementary halves 4 and 5 which are relatively movable from the open position of the upper mold, to the closed or blowing position of the mold next below.

The mold half 5 mounts a hollow needle 6 connected with a source not shown, of pressurized blowing fluid, and located generally on or in a plane through the vertical central axis of the mold, near the lower end thereof. Each mold half of mold each as shown, has a recess 7 in its upper end. The recesses are constricted at their lower termini to conjointly form a blowing orifice of reduced area when the two halves are moved together. At their lower ends the halves of each pair are provided with metallic plate sections 9 which cooperate to pinch off and close the parison at its contiguous end when the halves are fully closed together.

A length of tubing forming a parison is enclosed between each pair of mold halves 4 and 5, as shown by the intermediate pair of mold halves in FIG. 1, wherein a needle 6 has punctured the parison and pinch-off plate sections 9 have closed the contiguous end thereof. When a bottle has been completed and demolded, the appendage formed by and between recesses 7 of each pair, is cut off.

Referring to FIG. 2, mold halves 4a, 5a are shown in their open position with an interposed length of tubing 2 extruded from head 1. The tube is cut off by shearing means schematically indicated at 9a. After the mold halves are moved into their cooperating position shown in FIG. 3, wherein the right end of the parison has been sealed, a nozzle 12 is moved into fluid-tight engagement with the order and open end thereof. Subsequent introduction of pressure fluid through the nozzle effects expansion of the parison to form a bottle 11a.

Turning to FIG. 4 there is shown a portion of apparatus for discontinuous blowing through a passageway formed in a hot plastic mass of an end portion of the parison. The two molds halves 4b and 5b are shown closed about a parison 10b. The mold halves, at their ends shown, have axial recesses or channels 15 which conjointly define a passageway or chute. The recesses cooperate to shape, from the enclosed portion of the parison, a mass 13. The mass should be of minimum external surface area so that it retains a high internal temperature at which it is soft or fluid.

A slide 14 cuts off the end portion of the parison enclosed within the mold halves 4b, 5b, and carries a nozzle 14a which in the position shown, FIG. 4, has a fluid outlet in contact with and in axial alignment with mass 13. Introduction of fluid under pressure to nozzle 14a causes a jet of fluid to pierce the mass and thus form a passageway to the interior of parison 10b to effect expansion thereof. The hotter the mass, the greater the ease of penetration by the jet. The line of easiest penetration will in general be along the central axis of the mass.

DESCRIPTION OF THE PREFERRED EMBODIMENTS

Figure 5:
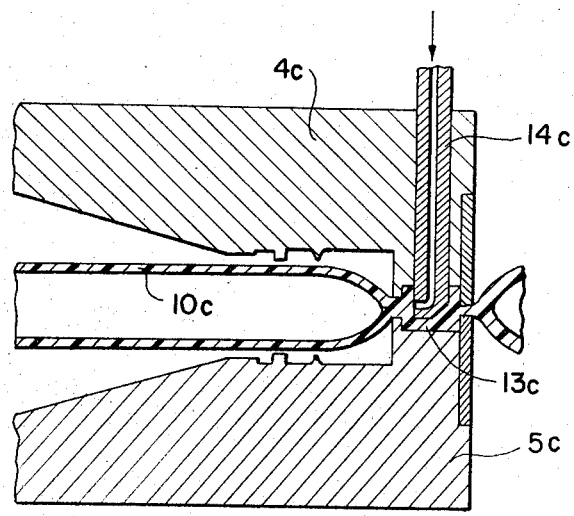
FIGS. 5 through 8 show in axial section, several forms of apparatus by which the method of the present invention may be carried into practice.

Turning to FIGS. 5 through 8 there is shown apparatus for performing the method of the present invention. In FIG. 5, the end portions of mold halves 4c, 5c, when closed together, pinch off the continguous section of tubular extrusion or parison 10c. Mold half 4c is provided with a radially-disposed bore in which a blowing pipe 14c is fixed. The radially inward end of the pipe protrudes into the plastic mass 13c formed by and between the recesses in the end wall of the halves, and has its outlet directed axially toward and in contact with the sealed end of the parison. When pressure fluid is connected with the external end of pipe 14c a jet is created which pierces the otherwise closed end of the parison and thus gains entrance to the interior thereof and expands it to the shape of the mold.

Figure 6:
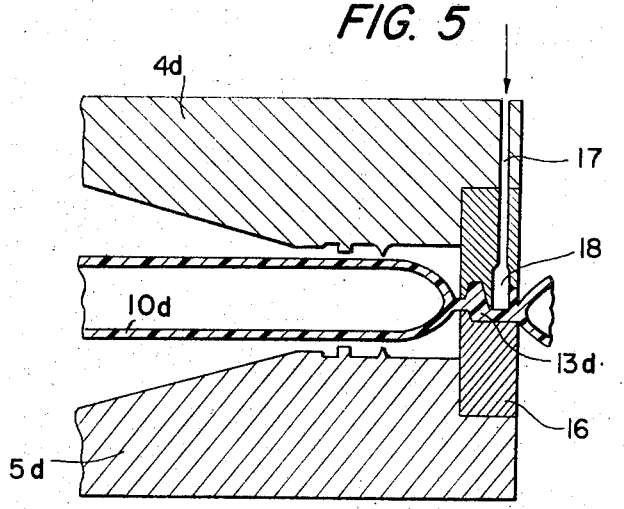

FIG. 6 shows a preferred modification wherein the contiguous ends of mold halves 4d, 5d have fixed in their end walls, parts which, when the halves are closed together, conjointly form a metal plate 16. Molds for apparatus operating in continuous procedure are usually equpped with such plates. The plate parts have recesses like 15, FIG. 4, which conjointly define a passageway forming from the enclosed parison, a mass 13d. As in the construction of FIGS. 4 and 5, the recesses in the plate parts are constructed at their inner ends to neck down the parison, while leaving an opening of reduced area through which blowing fluid may pass.

Figure 7:
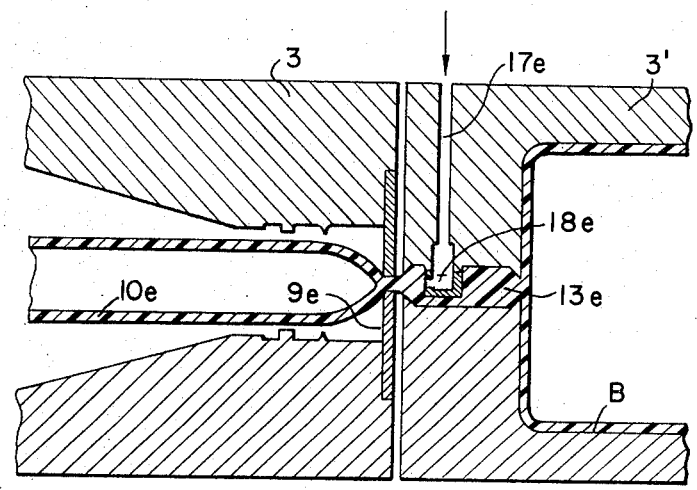

One mold half such as 4d has a bore forming, with an aligned radial bore in the corresponding plate part, a continuous tubular conduit 17 opening at its radially-inward end into the aforesaid passageway and the mass of hot plastic material shaped thereby. A removable and replaceable nozzle or insert 18, which has the same form and construction as shown at FIG. 7, is within and fits the radially inward end of the conduit and chamber, and has a jet-forming orifice directed axially in the direction of parison 10d. This insert enables the size of the orifice to be varied as may be required, by the substitution of one insert for another.

As is clear from inspection and comparison, the construction here permits a diminution in the total or overall length of the mold for any given height of bottle or like article. The construction shown in FIGS. 5 and 6 can be used in apparatus of the continuous, as well as the discontinuous type. In the latter case the only requirement is that the two ends of the parison are closed by the two mold halves when they are brought together.

Figure 8:
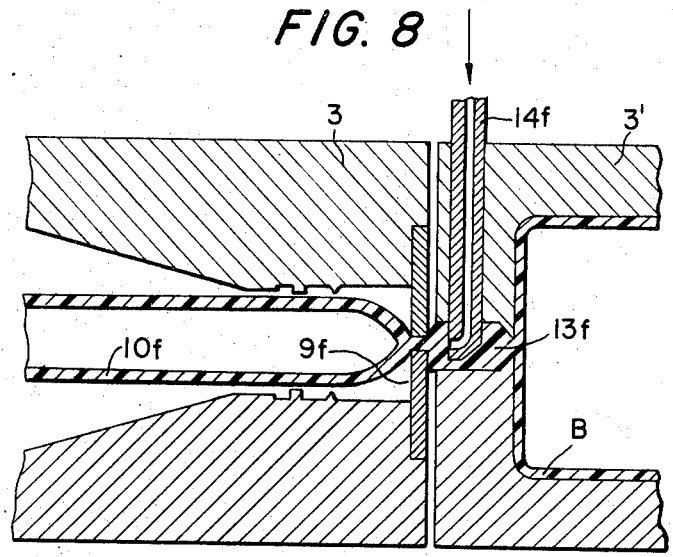

FIGS. 7 and 8 illustrate constructions embodying the invention and of particular utility in apparatus of the continuously operating type. FIG. 7 shows end portions of a mold pair 3' in advance of a second pair 3. Both mold halves are shown in closed position and a bottle B has been shaped in and by the mold 3'. The parison 10e in mold 3 is about to be blown.

The radial bore 17e is formed in the thickened base of one of the halves of mold 3' and terminates at its radially-inward end in an enlargement opening into an insert 18e which, as previously noted in connection with FIG. 6, may be removed and replaced as desired, by one of different orifice size. The halves of mold 3' are shown to have recesses in their end walls which conjointly define an axially-extending passageway shaping a mass 13e of plastic material of the parison. The recesses are constricted at their ends nearest the next following mold 3, and the jet-forming orifice of insert 18e is directed axially toward that mold. The contiguous ends of mold halves 3 have fixed therein relatively thin metallic parts forming a plate 9e which necks down the end of parison 10e in a way clear from inspection of the figure.

When presure fluid is introduced into bore 17e it forms a jet piercing the hot plastic mass 13e to thereby effect expansion of the parison 10e into contact with the walls of the mold.

The construction here shown enables a still greater reduction in the over-all length of the molds, for a bottle or article of given longitudinal dimension. This is because the base of each pair of mold halves must in any event have a certain thickness or axial dimension, in order to provide therein for conduits or passages not shown, for the flow of coolant.

FIG. 8 has the same general construction and mode of operation, and advantages as that of FIG. 7. It differs from FIG. 7 only in that blowing pipe 14f is secured in a radial bore in the base or trailing end of one of the halves of mold 3', and has its radially-inward end formed as a nozzle in and directed axially of the molds, toward the trailing mold 3. Thus when pressure fluid is forced into the pipe, it jets its way through the hot plastic mass 13f, into parison 10f to effect expansion and shaping thereof. In this construction the entire pipe 14f may be removed and replaced by one having an orifice of different effective jet-forming size, as desired.

OPERATION

The operation will be generally clear from the foregoing description. In FIG. 8 for example, the plastic tube is extruded continuously and descends from the extrusion head not shown. The molds 3, 3' etc. are alike. The halves of mold 3' have closed about one length of the tube and pressure fluid from the pipe, like 14f, in the mold below, not shown, has expanded the parison to form bottle B. The halves of mold 3 next close about the section of tube above. Plate 9f necks down the contiguous portion of the tube, leaving only an orifice affording access of fluid to parison 10f. Fluid under pressure is then introduced through pipe 14f. This creates a jet which opens a passage through the mass 13f, into parison 10f to effect its expansion and shaping. After the parison in mold 3 has been shaped and cooling of mold 3' effected, the latter mold is opened and attachment of mass 13f to bottle B is severed.

As numerous changes of shape and details of construction will be clear to those skilled in the art, after a study of the foregoing description, it should be taken in an illustrative rather than a limiting sense.

What is claimed is:

1. The method of blowing a plurality of hollow articles from an elongated extruded tube of plastic material which comprises closing a plurality of successive molds formed by paired mold halves about contigous lengths of said tube to enclose in each said mold a hollow parison of plstic material and to form a mass of said material between and connecting adjacent said parisons, and sequentially acting upon each parison by directing a fluid first generally radially inwardly of said mold between the ends of said mass toward substantially the longitudinal axis of said mass and then generally axially to penetrate said mass along said axis to enter within the confines of and inflate said parison to a position juxtaposed to the walls of said mold.

2. The method of claim 1, including the steps of cooling the first pair of mold halves to solidify the article therein and the confined mass of plastic, opening the halves of the first pair, and severing the mass from the article therein.

3. A method according to claim 1 including, after said directing step, the step of severing from each other the parisons connected to each other via the mass against which said jet has been directed.

* * * * *